US008494576B1

(12) United States Patent
Bye et al.

(10) Patent No.: US 8,494,576 B1
(45) Date of Patent: *Jul. 23, 2013

(54) NEAR FIELD COMMUNICATION AUTHENTICATION AND VALIDATION TO ACCESS CORPORATE DATA

(75) Inventors: Stephen James Bye, Atlanta, GA (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,801

(22) Filed: May 3, 2012

(51) Int. Cl.
*H04M 1/00* (2006.01)

(52) U.S. Cl.
USPC ....... 455/550.1; 455/41.1; 455/403; 713/182; 713/186

(58) Field of Classification Search
USPC ............... 455/550.1, 41.1, 403; 713/182, 186
See application file for complete search history.

(56) References Cited

U.S. PATENT DOCUMENTS

| | | | | |
|---|---|---|---|---|
| 6,668,322 | B1 * | 12/2003 | Wood et al. | 713/182 |
| 6,895,234 | B1 * | 5/2005 | Laursen et al. | 455/403 |
| 8,238,823 | B2 * | 8/2012 | Maugars et al. | 455/41.1 |
| 2006/0224901 | A1 * | 10/2006 | Lowe | 713/186 |
| 2007/0177771 | A1 * | 8/2007 | Tanaka et al. | 382/115 |
| 2007/0197261 | A1 * | 8/2007 | Humbel | 455/558 |
| 2008/0014867 | A1 * | 1/2008 | Finn | 455/41.1 |
| 2008/0188178 | A1 * | 8/2008 | Maugars et al. | 455/41.1 |
| 2010/0052844 | A1 * | 3/2010 | Wesby | 340/5.7 |
| 2010/0162028 | A1 | 6/2010 | Frank et al. | |
| 2011/0035604 | A1 * | 2/2011 | Habraken | 713/193 |

OTHER PUBLICATIONS

FAIPP Pre-Interview Communication dated Oct. 24, 2012, U.S. Appl. No. 13/463,797, filed May 3, 2012.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.

* cited by examiner

*Primary Examiner* — Charles Shedrick

(57) ABSTRACT

A system for near field communication authentication (NFC) and validation to access corporate data is provided. The system comprises a mobile phone, an enterprise server, a building access sensor coupled to the server, and an enterprise network comprising a domain. The sensor comprises a NFC transceiver. The phone comprises a NFC transceiver and a trusted security zone which comprises private enterprise credentials and an application, where the application establishes a wireless link to the sensor via the NFC transceiver, couples the NFC transceiver with memory storing the credentials, and transmits the credentials to the sensor via the NFC transceiver. The enterprise server comprises a trusted security zone and an application stored in the trusted security zone, where the application receives the credentials via the sensor, authorizes access to the building based on the credentials, and authenticates the user to the domain on the enterprise network.

20 Claims, 7 Drawing Sheets

NEAR FIELD COMMUNICATION AUTHENTICATION AND VALIDATION TO ACCESS CORPORATE DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near field communication (NFC) refers to short-range wireless radio communication between two devices, typically occurring over distances no more than a few centimeters. NFC radio communication may be used for financial transactions such as completing a payment transaction from a mobile phone encapsulating an electronic credit card and/or debit card to a point-of-sale (POS) terminal. NFC radio communication may be used to provide personal identification and/or to electronically access physical spaces, for example to provide a student identification, an employee identification, a medical identification; to activate a badge reader to unlock an entry door; to access a hotel room; to access a rental car. NFC radio communication may be used for communicating content such as reading explanatory information from an NFC tag coupled to a placard in a museum or in a retail display.

SUMMARY

In an embodiment, a system for near field communication authentication and validation to access corporate data is disclosed. The system comprises a mobile phone, an enterprise server, a building access sensor coupled to the enterprise server, and an enterprise network comprising a domain. The building access sensor comprises a near field communication (NFC) transceiver. The mobile phone comprises a near field communication transceiver and a trusted security zone which comprises private enterprise credentials and an application, where the application establishes a wireless link to the building access sensor via the near field communication transceiver, couples the near field communication transceiver with memory in the trusted security zone of the mobile phone storing the private enterprise credentials, and transmits the private enterprise credentials to the building access sensor via the near field communication transceiver. The enterprise server comprises a trusted security zone and an application stored in the trusted security zone, where the application receives the private enterprise credentials via the building access sensor, authorizes access to the building based on the private security credentials, and authenticates the user identified by the private enterprise credentials, granting the user access to a computer accessing the domain on the enterprise network.

In an embodiment, a method of near field communication authentication and validation to access corporate data is disclosed. The method comprises establishing a near field communication wireless link between a building access sensor and a mobile phone, where the mobile phone comprises a trusted security zone and wherein the trusted security zone comprises private enterprise credentials. The near field communication transceiver in the mobile phone is coupled with memory in the trusted security zone storing the private enterprise credentials. The private enterprise credentials are transmitted to the building access sensor via the near field communication wireless link. The private enterprise credentials are received by an application executing on an enterprise server coupled to the building access sensor, where the application executes in a trusted security zone on the enterprise server. Access to the building is authorized based on the private enterprise credentials and the user identified by the private enterprise credentials is authenticated to a domain on an enterprise network by the enterprise server.

In an embodiment, a method of near field communication authentication and validation to access corporate data is disclosed. The method comprises establishing a near field communication wireless link between a building access sensor and a mobile phone, where the mobile phone comprises a trusted security zone and a biometric reader and wherein the trusted security zone comprises private enterprise credentials. The near field communication transceiver in the mobile phone is coupled with memory in the trusted security zone storing the private enterprise credentials. The private enterprise credentials are transmitted to the building access sensor via the near field communication wireless link. The private enterprise credentials are received by an application executing on an enterprise server coupled to the building access sensor, where the application executes in a trusted security zone on the enterprise server. Access to the building is authorized based on the private enterprise credentials and the user identified by the private enterprise credentials is authenticated to a domain on an enterprise network by the enterprise server. A wireless link is established between a computer on the enterprise network and the mobile phone and a user of the mobile phone is authenticated on the computer based on identification sent from the biometric reader on the mobile phone.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
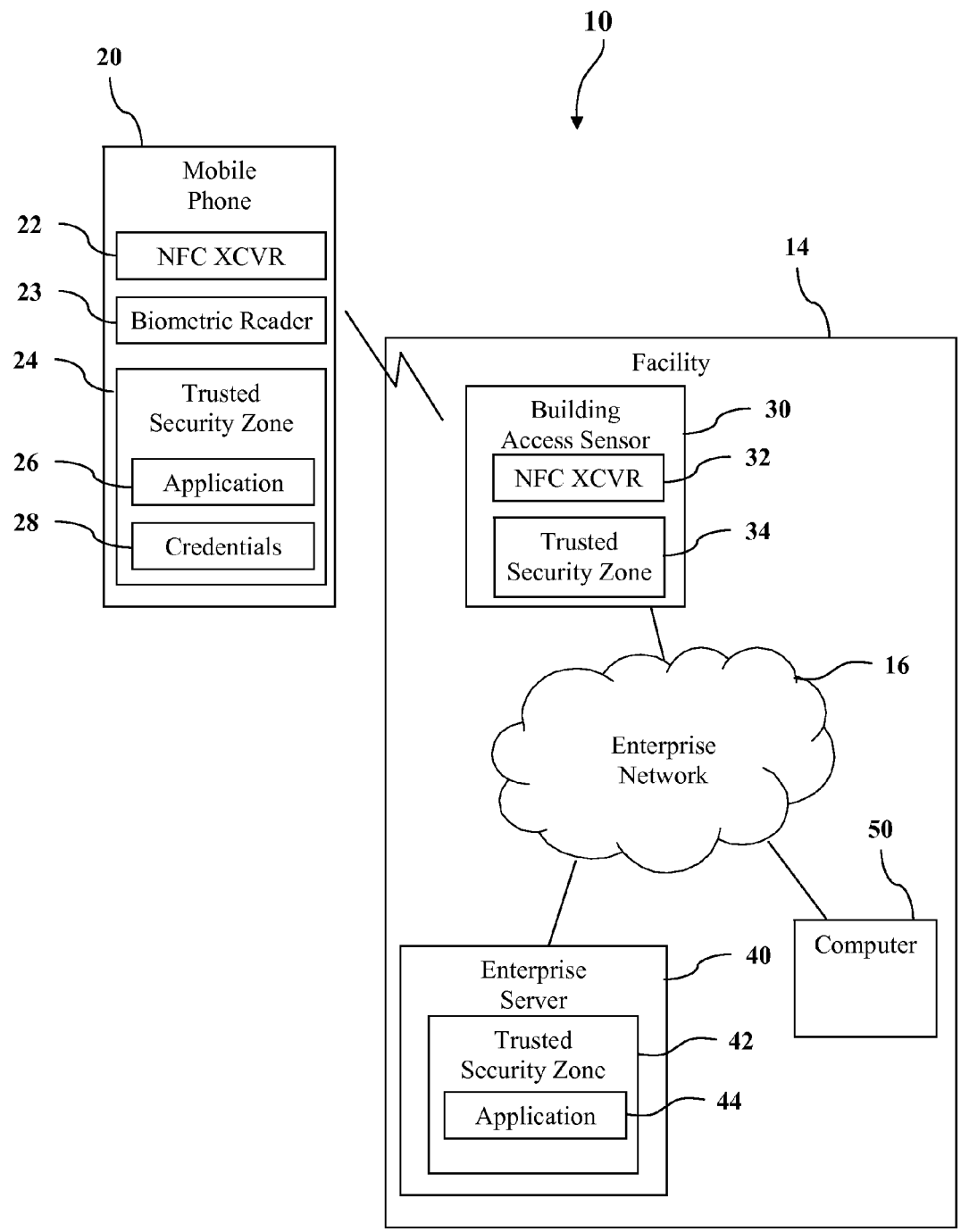
FIG. 1 is a block diagram of a system for near field communication authentication and validation to access corporate data according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Corporate data historically has been stored on enterprise-based servers. With the increasing use of Internet, or "cloud" based storage facilities, the demand for enhanced security is rising. Access to corporate data and applications, whether stored on local enterprise servers or in Internet storage services, is typically granted through a login process and a physical data entry of a password. Near field communication (NFC) allows for transactions, data exchange, and wireless connections between two devices in proximity to each other. Technology based on near field communication specifications may be used in a mobile phone or similar mobile device to enable users to securely store credentials on the mobile phone to be used as identification. Extending the use of the credentials to not only provide identification for purposes such as building access, but to also initiate authentication onto the enterprise network to provide access to corporate data may enable enhanced security for the enterprise.

The present disclosure teaches a system and method for near field communication authentication and validation to access corporate data. The system provides the ability to utilize a trusted security zone architecture built into the main processor chipset of a mobile phone to implement a secure method for storing private enterprise credentials on the mobile phone for use in contactless access to facilities and additionally to authenticate onto the enterprise network. A near field communication transceiver built into the mobile phone may be coupled to memory in the trusted security zone of the mobile phone storing the private enterprise credentials. When the near field communication transceiver in the mobile phone is brought into close proximity to a near field communication transceiver in a building access sensor in a corporate office, a contactless wireless link between the two near field communication transceivers is established.

The mobile phone transmits the private enterprise credentials to the building access sensor over the near field communication wireless link. The building access sensor validates the private enterprise credentials for building access privileges and sends the credentials to an enterprise server on the corporate enterprise network for network authentication. Once the building access privileges and network authentication are verified, the employee owning the mobile phone is allowed entry into the facility and the enterprise network domain the employee belongs to is aware of their entry and may allow them access to the enterprise network based on their access privileges. The user's personal computer in their office may also be notified of the user's entry, waking up from a low power state and/or rebooting to be available for use when the user arrives at the office. A second authentication may be performed when the near field communication transceiver in the mobile phone is brought into close proximity with the user's personal computer. The user's personal computer may also comprise a trusted security zone, allowing a trusted execution environment between the computer and the mobile phone.

In an embodiment, the mobile phone, the building access sensor, and the enterprise server may all implement trusted security zones to ensure that a chain of trust between the devices is maintained. The chain of trust enables the security to send the private enterprise credentials from the mobile phone to the building access sensor and on to the enterprise server without exposing the data to hackers or malware applications which may try to obtain the credentials. Because the trusted security zone in each device provides hardware and software protections against attacks and isolates functions outside the trusted security zone from operating when applications in the trusted security zone are executing, the private enterprise credentials may be considered trusted, meaning not only can they be authenticated as the proper credentials for access, but they may be considered as having come from the mobile device and not another entity.

In addition to authenticating the user of the mobile phone on a domain on the enterprise network based on the private enterprise credentials, the enterprise network may support additional capabilities to leverage the integration of the mobile phone network with enterprise network services. The enterprise server may track the location of the mobile phone as it moves through the facility, enabling access to authorized servers and networks based on the location of the mobile phone. The employee may be granted access to the enterprise network domain from other computers based on their location in the facility. The mobile phone may also be authorized to access the enterprise network domain directly, for example to access corporate email or view a document, based on authentication of the private enterprise credentials.

The enterprise server may prepare the computer of the mobile phone user upon their entrance to the building, so that their computer is powered up and ready to be accessed when they arrive at their office. The mobile phone may also contain a biometric reader, such as a fingerprint reader, and may utilize the near field communication transceiver to establish a wireless link with a near field communication transceiver in their computer when the user of the mobile phone reaches their office. The identification from the biometric reader is sent over the wireless link to the computer and the user is authenticated onto the computer. The user may use their phone to wirelessly access the building, authenticate onto the enterprise network, and login to their computer, allowing the user to have their work environment up and ready to go after only seconds of reaching their office. All of this is accomplished through a trusted execution environment providing secure and trusted transactions across the involved devices.

In an embodiment, a trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming mainstream features in mobile device chipsets. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete Trusted Execution Environment (TEE) may be implemented through the use of the trusted security zone hardware and software architecture. The Trusted Execution Environment is an execution environment that is parallel to the execution environment of the main mobile device operating system. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as sensors, medical devices, point-of-sale terminals, industrial automation, handheld terminals, automotive, etc.

The trusted security zone may be implemented by partitioning all of the hardware and software resources of the mobile device into two partitions: a secure partition and a normal partition. In some contexts, the secure partition may be referred to as a secure world or a secure execution world and the normal partition may be referred to as a non-secure world or a non-secure execution world. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution environment, the main mobile operating system in the normal partition is suspended, and applications in the normal partition are prevented from accessing the secure peripherals and data. This prevents corrupted applications or malware applications from breaking the trust of the device.

The trusted security zone may be implemented by partitioning the hardware and software resources to exist in a secure subsystem which is not accessible to components outside the secure subsystem. The trusted security zone is built into the processor architecture through hardware logic present in the trusted security zone which enables a perimeter boundary between the secure partition and the normal partition. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications may run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors may context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the mobile device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 10 for near field communication authentication and validation to access corporate data is described. The system 10 comprises a mobile phone 20, and a facility 14, where the facility 14 comprises a building access sensor 30, an enterprise network 16, an enterprise server 40, and a computer 50. The mobile phone 20 comprises a near field communication transceiver 22 and a trusted security zone 24, where the trusted security zone 24 comprises an application 26 and private enterprise credentials 28. The mobile phone 20, while shown as a mobile phone, may be a personal digital assistant (PDA), a media player, or other network enabled electronic device. The building access sensor 30 comprises a near field communication transceiver 32 and a trusted security zone 34. The enterprise server 40 comprises a trusted security zone 42 and an application 44 which is stored and executes in the trusted security zone 42.

When the mobile phone 20 is in close proximity to the building access sensor 30, the application 26 in the trusted security zone 24 may establish a wireless link to the building access sensor 30 via the near field communication transceiver 22 in the mobile phone 20 and the near field communication transceiver 32 in the building access sensor 30. The application 26 then couples the near field communication transceiver 22 with memory in the trusted security zone 24 of the mobile phone 20 storing the private enterprise credentials 28 and transmits the private enterprise credentials 28 to the building access sensor 30 via the near field transceiver 22. The application 44 in the trusted security zone 42 on the enterprise server 40 receives the private enterprise credentials 28 via the building access sensor 30. The application 44 authorizes access to the facility 14 based on the private enterprise credentials 28. The application 44 then authenticates the user identified by the private enterprise credentials 28 to a domain on the enterprise network 16. Authenticating the user to a domain on the enterprise network 16 may also provide enhanced security by decreasing the benefit of someone following the user into the building. The domain on the enterprise network may expect a user to be authenticated at the building access sensor 30 prior to allowing access to a computer 50 inside the facility 14. Therefore, a person who gained access to the facility 14 by closely following someone else would not be able to access computers and the enterprise network 16 because they did not authenticate upon entry.

In an embodiment, the building access sensor 30 further comprises a trusted security zone 32. The building access sensor 30 may process the private enterprise credentials 28 prior to sending them to the enterprise server 40 and the trusted security zone 34 may be implemented to ensure the security and maintain the trust of the private enterprise credentials 28. The building access terminal 30 may be a potential hacking target, and providing the trusted security zone 34 ensures the private enterprise credentials 28 cannot be accessed by applications outside of the trusted security zone 34.

In an embodiment, the trusted security zone 24 on the mobile phone 20 enables execution of a Trusted Execution Environment (TEE) on the mobile phone 20, where the Trusted Execution Environment is a secure and trusted hardware and software environment that is not accessible to applications and systems in the main mobile phone 20 operating system. The Trusted Execution Environment execution environment is parallel to the main execution environment of the mobile phone 20 operating system, and applications and data residing in the Trusted Execution Environment on the mobile phone 20 are trusted and protected against attacks. In an embodiment, the trusted security zone 42 on the enterprise server 40 enables execution of a Trusted Execution Environment (TEE) on the enterprise server 40, where the Trusted Execution Environment is a secure and trusted hardware and software environment that is not accessible to applications and systems in the main enterprise server 40 operating system. The Trusted Execution Environment on the enterprise server 40 may exist in a trusted services environment when combined with the mobile phone 20 and the building sensor 30 running their own Trusted Execution Environments. The trusted services environment allows deployment of secure services across devices while maintaining trust and resisting attacks.

In an embodiment, the main mobile phone 20 operating system is disabled when the application 26 in the trusted security zone 24 is executing. Software architecture to support the trusted security zone 24 may be provided through a dedicated secure operating system running trusted applications. When the application 26 in the trusted security zone 24 is running, the main mobile phone 20 operating system may be paused and processor resources may be dedicated to the secure operating system running the trusted security zone 24 based on tightly controlled mechanisms such as secure software instructions or hardware exceptions.

In an embodiment, the main enterprise server 40 operating system is disabled when the application 44 in the trusted security zone 42 is executing. Software architecture to support the trusted security zone 42 may be provided through a dedicated secure operating system running trusted applications. When the application 44 in the trusted security zone 42 is running, the main enterprise server 40 operating system may be paused, and processor resources may be dedicated to the secure operating system running the trusted security zone 42 based on tightly controlled mechanisms such as secure software instructions or hardware exceptions. Access to hardware resources may be blocked from applications executing in the main enterprise server 40 operating system, limiting access to sensitive data.

In an embodiment, transmitting the private enterprise credentials 28 from the trusted security zone 24 on the mobile phone 20 to the trusted security zone 42 on the enterprise server 40 ensures a chain of trust is not broken and the private enterprise credentials 28 are trusted by the enterprise server 40 to have originated from the mobile phone 20. Because the mobile phone 20 and the enterprise server 40 both operate a Trusted Execution Environment, the chain of trust is maintained when transmitting the private enterprise credentials 28 between them. The chain of trust may also include the building access sensor 30 if it maintains a trusted security zone 34. Keeping the private enterprise credentials 28 in a trusted environment from the beginning of the transaction to the end of the transaction ensures they will be trusted when reaching their destination.

Figure 2:
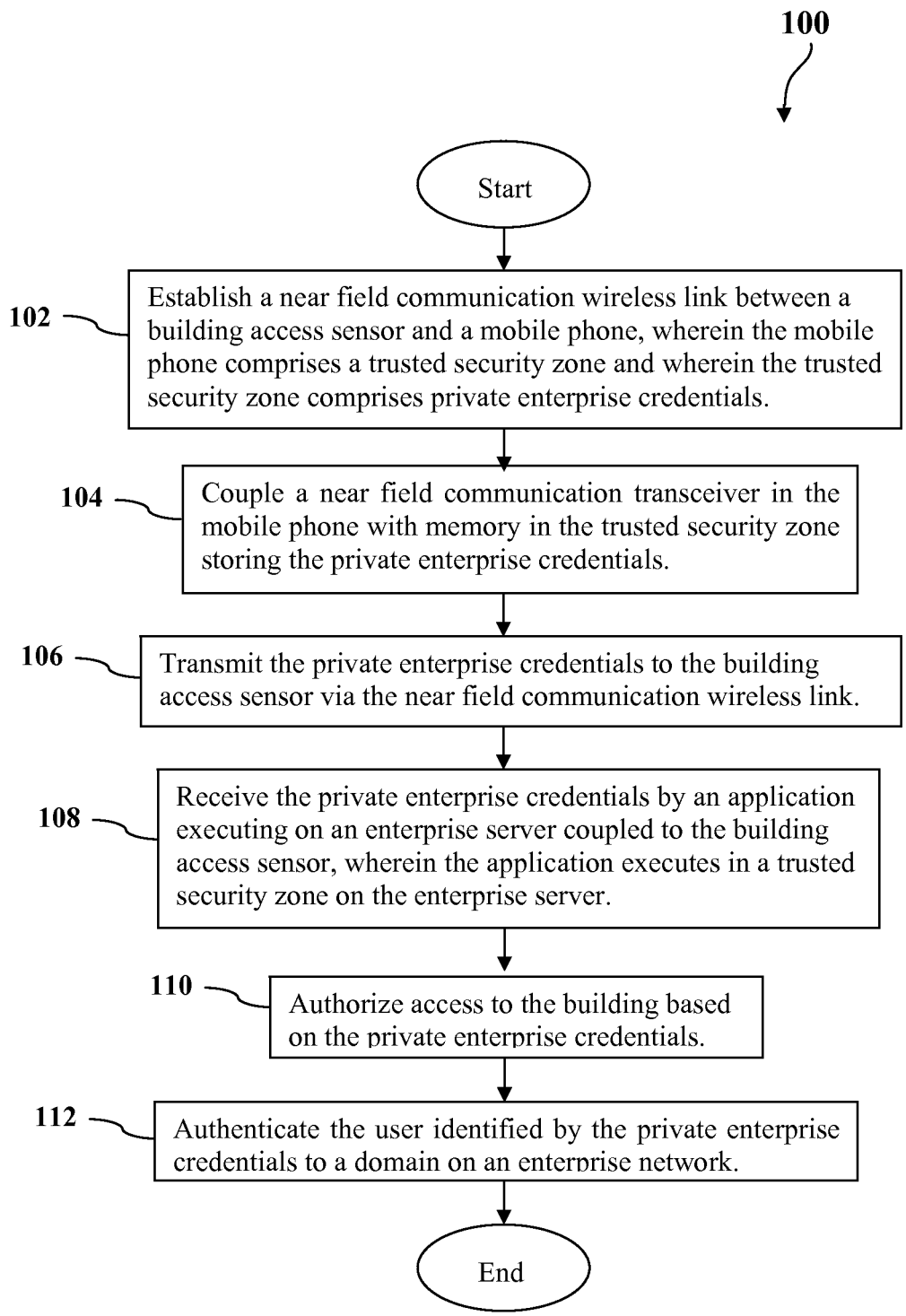
FIG. 2 is a flow chart of a method of near field communication authentication and validation to access corporate data according to an embodiment of the disclosure.

Turning now to FIG. 2, a method 100 of near field communication authentication and validation to access corporate data is described. At block 102, a near field communication wireless link is established between a building access sensor 30 and a mobile phone 20, where the mobile phone 20 comprises a trusted security zone 24 and where the trusted security zone 24 comprises private enterprise credentials 28. When the mobile phone 20 comes into proximity of the building access sensor 30, a wireless link is established between a near field communication transceiver 22 in the mobile phone 20 and a near field communication transceiver 32 in the building access sensor 30. At block 104, the near field communication transceiver 22 in the mobile phone 20 is coupled with memory in the trusted security zone 24 storing the private enterprise credentials 28. The near field communication transceiver 22 is coupled to the memory in the trusted security zone 24 in preparation for transmitting data over the wireless link.

At block 106, the private enterprise credentials 28 are transmitted to the building access sensor 30 via the near field communication wireless link. At block 108, the private enterprise credentials 28 are received by an application 44 executing on an enterprise server 40 coupled to the building access sensor 30, where the application 44 executes in a trusted security zone 42 on the enterprise server 40. The application 44 executes in the trusted security zone 42 and is coupled to the near field communication transceiver 32 in the building access sensor 30. When the private enterprise credentials 28 are transmitted over the wireless link from the mobile phone 20, they are received and processed by the application 44. At block 110, access to the building is authorized based on the private enterprise credentials 28. The application 44 verifies the private enterprise credentials 28 and authorizes access to the building. At block 112, the user identified by the private enterprise credentials 28 is authenticated to a domain on an enterprise network 16. The application 44 also authenticates the user to the domain on the enterprise network 16 based on the private enterprise credentials 28, where the domain on the enterprise network 16 comprises a plurality of computer resources the user may access based on a single authentication.

In an embodiment, the building access sensor 30 further comprises a trusted security zone 34. The building access sensor 30 may play a more prominent role in the access transaction rather than simply coupling to the enterprise server 40 to process the private enterprise credentials 28. The building access sensor 30 may also support a Trusted Execution Environment and process the private enterprise credentials 28 to authorize access to the building prior to sending the private enterprise credentials 28 to the enterprise server 40 for authentication to the domain on the enterprise network 16.

In an embodiment, transmitting the private enterprise credentials 28 from the trusted security zone 24 on the mobile phone 20 to the trusted security zone 34 on the building access sensor 30 and from the trusted security zone 34 on the building access sensor 30 to the trusted security zone 42 on the enterpriser server 40 ensures a chain of trust is not broken and the private enterprise credentials 28 are trusted by the enterprise server 40 to have originated from the mobile phone 20. Because the mobile phone 20, building access sensor 30, and the enterprise server 40 each operate a Trusted Execution Environment, the chain of trust is maintained when transmitting the private enterprise credentials 28 between them. The Trusted Execution Environment may also extend to routers, switches, and other components comprising the enterprise network 16, and these network components may also implement trusted security zones. Keeping the private enterprise credentials 28 in a trusted environment from the beginning of the transaction to the end of the transaction ensures they will be trusted when reaching their destination and limits the exposure of the secure data.

In an embodiment, functions not executing in the trusted security zones 24, 34, and 42 of the mobile phone 20, the building access server 30, and the enterprise server 40 are disabled when the private security credentials 28 are being transmitted. Hardware and software architecture may support the trusted security zones 24, 34, and 42 on their respective devices. A dedicated operating system may run to support the trusted security zones 24, 34, and 42, and the main device operating systems may be paused while applications are executing in the trusted security zones 24, 34, and 42.

In an embodiment, the domain on the enterprise network 16 is an active directory domain and the enterprise server 40 is an active directory domain controller. Active directory is a directory service for Microsoft Windows domain networks and provides a central location for network administration and security. Enterprise servers that run active directory are call domain controllers and authenticate and authorize users and computers in a network domain.

In an embodiment, the method 100 further comprises granting access to a second enterprise server 40 based on a location of the mobile phone 20 in the building and based on user access permissions granted by the private enterprise credentials 28 of the mobile phone 20. The user of the mobile phone may be granted access to a domain on the enterprise network 16 upon entering the building. Additional functionality may be enabled by monitoring the location of the mobile phone 20 in the facility 14. For example, the initial authentication may be to a domain on the enterprise network 16 that is the primary domain for the user. When the enterprise network 16 detects that the mobile phone 20 has entered a lab area in a separate location of the facility 14, the user may be granted access to the second enterprise server 40 that resides in the lab area but is not on the primary domain on the enterprise network 16 for the user. The enterprise network 16 may detect the location of the mobile phone 16 based on near field communication transceivers located in the building, based on a Wi-Fi access point the mobile phone 20 is using, or through a Global Positioning Satellite (GPS) transceiver in the mobile phone 20.

Figure 3:
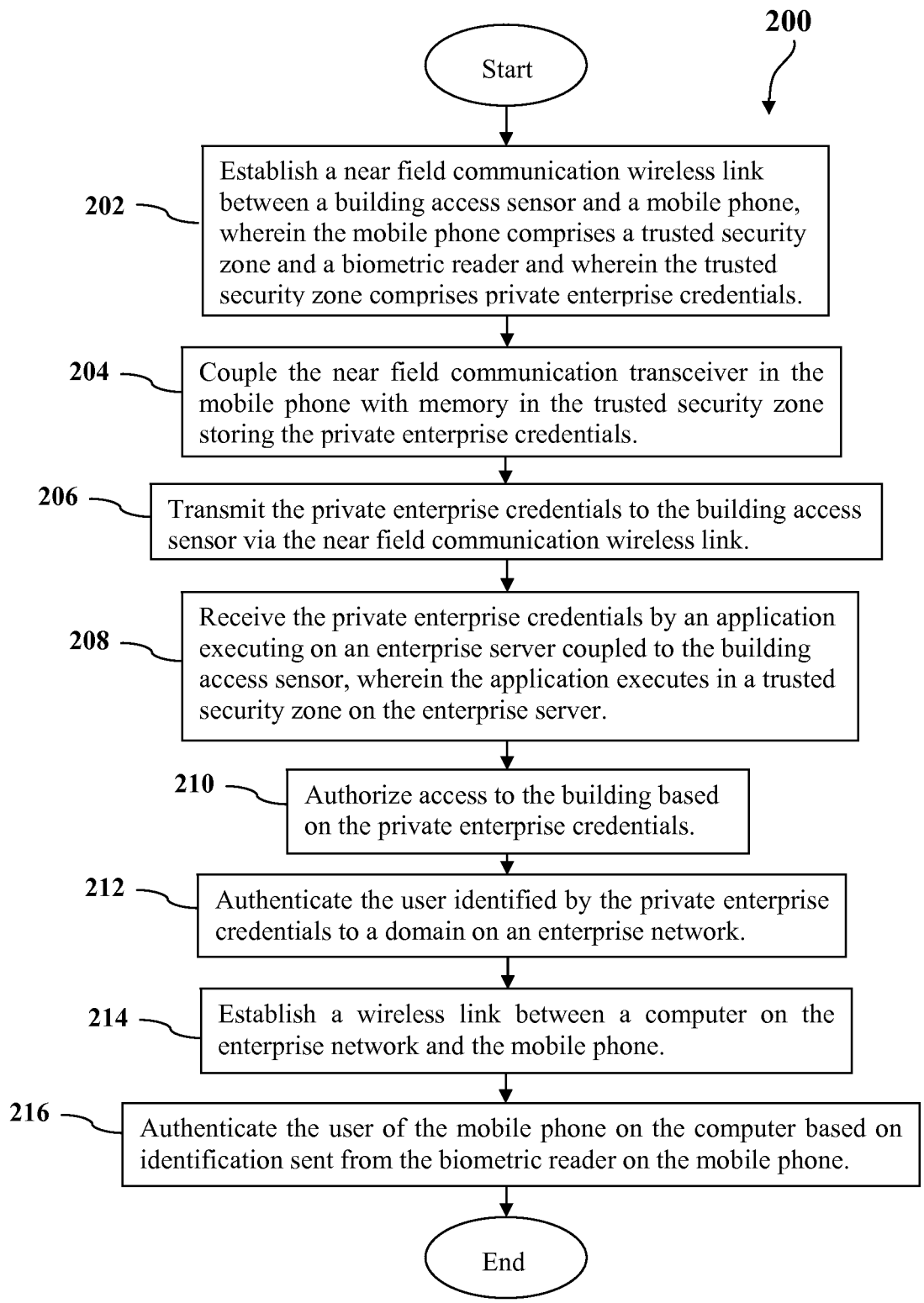
FIG. 3 is a flow chart of a method of near field communication authentication and validation to access corporate data according to an embodiment of the disclosure.

Turning now to FIG. 3, a method 200 of near field communication authentication and validation to access corporate data is described. At block 202, a near field communication wireless link is established between a building access sensor 30 and a mobile phone 20, where the mobile phone 20 comprises a trusted security zone 24 and a biometric reader 23 and where the trusted security zone 24 comprises private enterprise credentials 28. A wireless link is established between a near field communication transceiver 22 in the mobile phone 20 and a near field communication transceiver 32 in the building access sensor 30. At block 204, the near field communication transceiver 22 in the mobile phone 20 is coupled with memory in the trusted security zone 24 storing the private enterprise credentials 28. The near field communication transceiver 22 is coupled to the memory in the trusted security zone 24 in preparation for transmitting data over the wireless link. At block 206, the private enterprise credentials 28 are transmitted to the building access sensor 30 via the near field communication wireless link.

At block 208, the private enterprise credentials 28 are received by an application 44 executing on an enterprise server 40 coupled to the building access sensor 30, where the application 44 executes in a trusted security zone 42 on the enterprise server 40. The application 44, executing in the trusted security zone 42 of the enterprise server 40, is coupled to the near field communication transceiver 32 in the building access sensor 30 and receives and processes the private enterprise credentials 28. At block 210, access to the building is authorized based on the private enterprise credentials 28. The application 44 verifies the private enterprise credentials 28 and authorizes access to the building. At block 212, the user identified by the private enterprise credentials 28 is authenticated to a domain on an enterprise network 16. The application 44 then authenticates the user to the domain on the enterprise network 16 based on the private enterprise credentials 28. At block 214, a wireless link is established between a computer 50 on the enterprise network 16 and the mobile phone 20. When the user of the mobile phone 20 comes in proximity to the computer 50, the wireless link is established in preparation of logging the user onto the computer 50. At block 216, the user of the mobile phone 20 is authenticated on the computer 50 based on identification sent from the biometric reader 23 on the mobile phone 20. The biometric reader 23 on the mobile phone 20 obtains an identification from the user of the mobile phone 20. The mobile phone 20 then transmits the identification from the biometric reader 23 to the computer 50, and the user is logged onto the computer 50 based on a successful identification.

In an embodiment, the computer 50 on the enterprise network 16 comprises a trusted security zone and authenticating the user of the mobile phone 20 comprises maintaining trusted communications between the computer 50 and the mobile phone 20. The trusted security zone 24 on the mobile phone 20 may execute an application that controls the biometric reader 23 and transmits the identification to the computer 50. Authenticating the user via an application executing in the trusted security zone on the computer 50 ensures the trust of the identification and limits the access to the identification by applications outside the trusted security zone on the computer 50.

In an embodiment, authenticating the user of the mobile phone 20 on the computer further comprises authenticating the computer 50 to the domain on the enterprise network 16. The computer 50 may be coupled to the enterprise network 16 and when the user is logged on to the computer 50 the user may also be authenticated to the domain on the enterprise network 16. In an embodiment, the biometric reader 23 comprises one of a fingerprint recognition system, a facial recognition system, a retinal recognition system, or a voice recognition system. Biometric identifiers are the distinctive, measurable characteristics used as a form of identification and access control in computer systems. Because biometric identifiers are unique to individuals, they are more reliable in verifying identity than a password or personal identification number.

In an embodiment, the method 200 further comprises the enterprise server 40 notifying the computer 50 on the enterprise network 16 when the user identified by the private enterprise credentials 28 is authenticated on the enterprise network 16. The enterprise server 40, in addition to authenticating the user identified by the private enterprise credentials 28 to the domain on the enterprise network, may also provide access to other platforms or services. The computer 50 may be the personal desktop of the user identified by the private enterprise credentials 28 or another computer they use regularly. The enterprise server 40 may notify the computer 50 the user is in the facility 14, triggering the computer 50 to start up from a low power state and/or rebooting and be prepared for the user to login.

In an embodiment, the method 200 further comprises logging off the computer 50 and the domain on the enterprise network 16 when the wireless link between the computer 50 and the mobile phone 20 is broken. The wireless link is an indication of the proximity of the user of the mobile phone 20 to the computer 50. When the mobile phone 20 leaves the area of the computer 50 the wireless connection may be broken. Monitoring the wireless link and automatically logging off the computer 50 and the domain on the enterprise network 16 when the wireless link is broken may provide additional security and ensure the user does not leave access to the computer 50 available after leaving the area. Logging off the computer 50 and the domain on the enterprise network 16 may also be triggered by a user-defined timeout occurring after the wireless link is broken.

Figure 4:
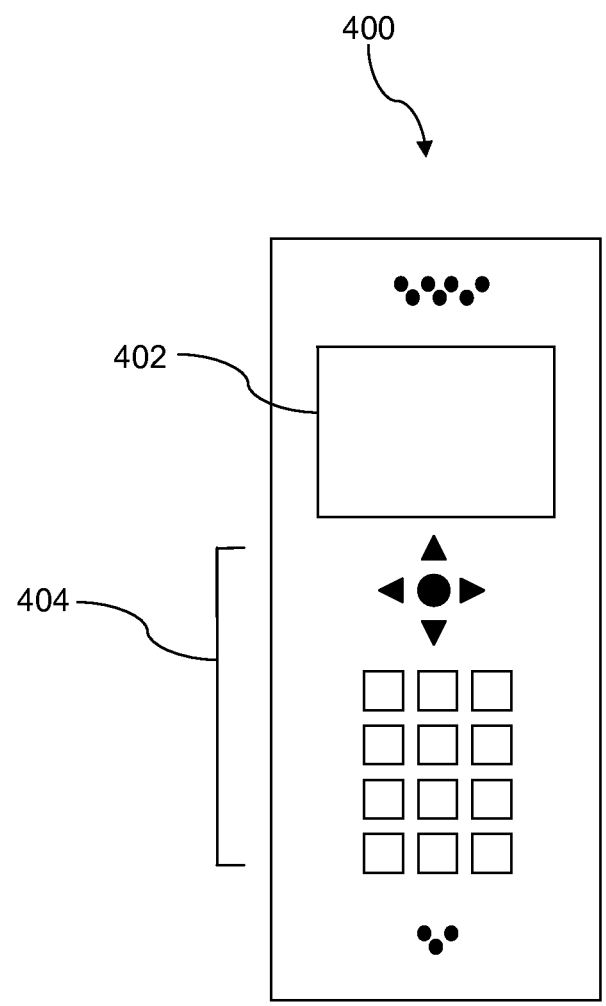
FIG. 4 is an illustration of a mobile device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
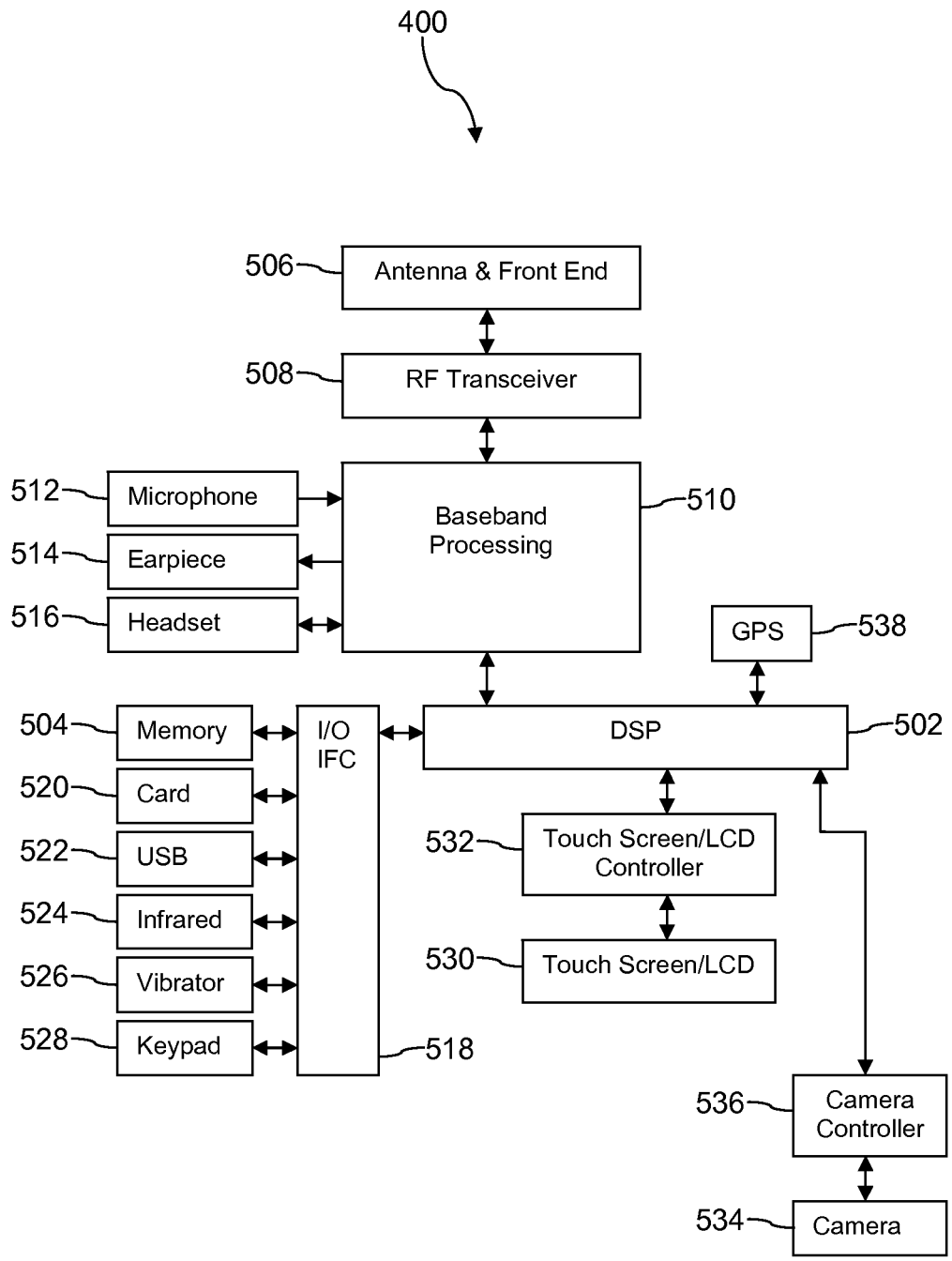
FIG. 5 is a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
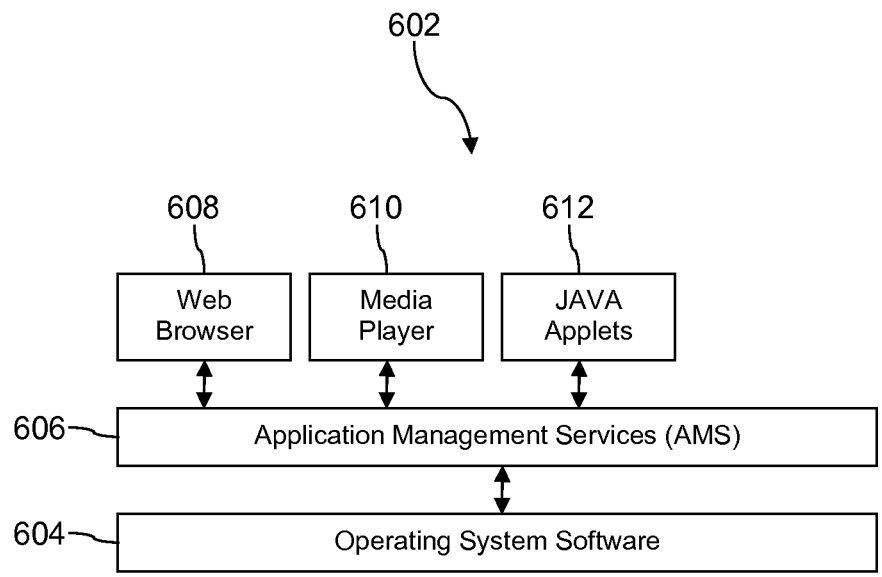
FIG. 6A is a block diagram of a software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
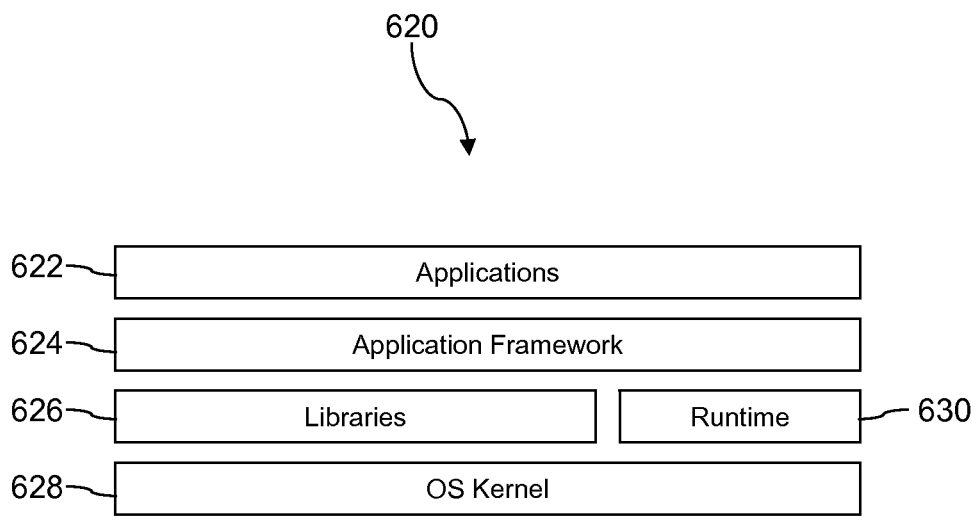
FIG. 6B is a block diagram of a software architecture for a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
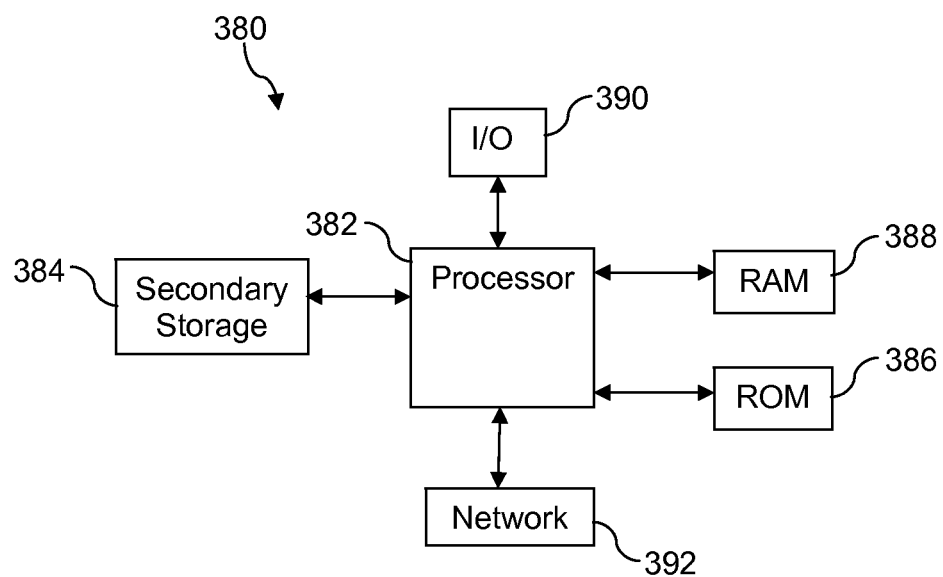
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for near field communication authentication and validation to access corporate data, comprising:
  a mobile device comprising a near field communication transceiver and a main processor chipset,
  a security zone architecture embedded in the main processor chipset, the security zone architecture comprising a secure partition of hardware and software resources, which include a plurality of secure partition applications, with a trusted execution environment, wherein the plurality of secure partition applications runs on a first virtual processor that is configured to execute in a time-sliced manner relative to a second virtual processor that runs a plurality of non-secure partition applications;
  a memory located within the secure partition of the mobile device that stores private enterprise credentials;
  an enterprise server comprising a security zone server security zone architecture, the security zone architecture including a secure partition of hardware and software resources with a trusted execution environment,
  an enterprise network comprising a domain;
  a building access sensor coupled to the enterprise server, wherein the building access sensor comprises a near field communication transceiver;
  an application of the plurality of secure partition applications stored in the secure partition on the mobile device and executable in the trusted execution environment on the mobile device, wherein the application, establishes a wireless link to the building access sensor via the near field communication transceiver on the mobile device and the near field communication transceiver on the building access sensor, couples the near field communication transceiver on the mobile device with the memory in the secure partition of the mobile device, and transmits the private enterprise credentials stored in the memory to the building access sensor via the near field communication transceiver on the mobile device and the near field communication transceiver on the building access sensor; and an application stored in the secure partition of the enterprise server and executable on the trusted execution environment on the enterprise server, wherein the application, receives the private enterprise credentials via the building access sensor, authorizes access to the building based on the private enterprise credentials, authenticates the user identified by the private enterprise credentials, and grants the user access to a computer accessing the domain on the enterprise network based on the authentication.

2. The system of claim 1, wherein the building access sensor further comprises a security zone architecture including a secure partition of hardware and software resources of the building access sensor with a trusted execution environment.

3. The system of claim 1, wherein the security zone architecture of the mobile device includes a non-secure partition of hardware and software resources, which include the plurality of non-secure partition applications, with a non-secure execution environment.

4. The system of claim 1, wherein the first virtual processor and the second virtual processor run on a single physical processor.

5. The system of claim 3, wherein the mobile device includes a main mobile device operating system which runs in the non-secure execution environment, and wherein the main mobile device operating system is disabled when the application stored in the secure partition on the mobile device is executing in the trusted execution environment on the mobile device.

6. The system of claim 1, wherein the enterprise server includes a non-secure partition of hardware and software resources with a non-secure execution environment and a main enterprise server operating system which runs in the non-secure execution environment, and wherein the main enterprise operating system is disabled when the application stored in the secure partition on the enterprise server is executing in the trusted execution environment on the enterprise server.

7. The system of claim 1, wherein the enterprise server is configured to track the location of the mobile device as the mobile device moves throughout the building.

8. A method of near field communication authentication and validation to access corporate data, comprising:

establishing, by an application of a plurality of secure partition applications, a near field communication wireless link between a building access sensor and a mobile device, wherein the mobile device comprises a main processor chipset with a security zone architecture embedded in the main processor chipset, wherein the security zone architecture comprises a secure partition of hardware and software resources, which include the plurality of secure partition applications, with a trusted execution environment, wherein the plurality of secure partition applications runs on a first virtual processor that is configured to execute in a time-sliced manner relative to a second virtual processor that runs a plurality of non-secure partition applications, and wherein the mobile device further comprises a memory located within the secure partition that stores private enterprise credentials;

coupling, by the application of the plurality of secure partition applications, a near field communication transceiver in the mobile phone with the memory in;

transmitting, by the application of the plurality of secure partition applications, the private enterprise credentials to the building access sensor via the near field communication wireless link; receiving, by an application executing on an enterprise server coupled to the building access sensor, the private enterprise credentials wherein the application executes on the enterprise server;

authorizing access to the building based on the private enterprise credentials; and authenticating the user identified by the private enterprise credentials to a domain on an enterprise network.

9. The method of claim 8, wherein the building access sensor further comprises a security zone architecture that comprises a secure partition of hardware and software resources with a trusted execution environment.

10. The method of claim 8, wherein the enterprise server is configured to track the location of the mobile device as the mobile device moves throughout the building.

11. The method of claim 8, wherein functions executable in a non-secure partition of the mobile device, functions executable in a non-secure partition of the building access sensor, and functions executable in a non-secure partition of the enterprise server are disabled when the private security credentials are being transmitted.

12. The method of claim 8, wherein the domain on the enterprise network is an active directory domain and the enterprise server is an active directory domain controller.

13. The method of claim 8, wherein the mobile device is a personally owned device and wherein an information technology (IT) administrator of the enterprise network opens and secures the trusted execution environment on the mobile device and installs the private enterprise credentials in the trusted execution environment.

14. The method of claim 8, further comprising granting access to a second enterprise server based on a location of the mobile device in the building and based on user access permissions granted by the private enterprise credentials of the mobile device.

15. A method of near field communication authentication and validation to access corporate data, comprising:

establishing, by an application of a plurality of secure partition applications, a near field communication wireless link between a building access sensor and a mobile device, wherein the mobile device comprises a biometric reader and a main processor chipset with a security zone architecture embedded in the main processor chipset, wherein the security zone architecture comprises a secure partition of hardware and software resources, which include the plurality of secure partition applications, with a trusted execution environment, wherein the plurality of secure partition applications runs on a first virtual processor that is configured to execute in a time-sliced manner relative to a second virtual processor that runs a plurality of non-secure partition applications, and wherein the mobile device further comprises a memory located within the secure partition that stores private enterprise credentials;

coupling, by the application of the plurality of secure partition applications, a near field communication transceiver in the mobile device with the memory;

transmitting, by the application of the plurality of secure partition applications, the private enterprise credentials to the building access sensor via the near field communication wireless link;

receiving, by an application executing on an enterprise server coupled to the building access sensor, the private enterprise credentials authorizing access to the building based on the private enterprise credentials;

authenticating a user identified by the private enterprise credentials to a domain on an enterprise network;

establishing a wireless link between a computer on the enterprise network and the mobile device; and authenticating, by the computer, the user of the mobile device based on identification sent from the biometric reader on the mobile device.

16. The method of claim 15, wherein the computer on the enterprise network comprises a security zone architecture, wherein the security zone architecture comprises a secure partition of hardware and software resources with a trusted execution environment.

17. The method of claim 15, wherein authenticating the user of the mobile device on the computer further comprises authenticating the computer to the domain on the enterprise network.

18. The method of claim 15, wherein the biometric reader comprises one of a fingerprint recognition system, a facial recognition system, a retinal recognition system, or a voice recognition system.

19. The method of claim 15, further comprising the enterprise server notifying the computer on the enterprise network when the user identified by the private enterprise credentials is authenticated on the enterprise network.

20. The method of claim 15, further comprising logging off the computer and the domain on the enterprise network when the wireless link between the computer and mobile device is broken.

* * * * *